United States Patent [19]
Gossman et al.

[11] Patent Number: 5,251,863
[45] Date of Patent: Oct. 12, 1993

[54] ACTIVE FORCE CANCELLATION SYSTEM

[75] Inventors: William Gossman, Silver Spring, Md.; Steve Hildebrand, Arlington, Va.

[73] Assignee: Noise Cancellation Technologies, Inc., Linthicum, Md.

[21] Appl. No.: 928,470

[22] Filed: Aug. 12, 1992

[51] Int. Cl.$^5$ .............................................. F16M 13/00
[52] U.S. Cl. ..................................... 248/550; 248/638
[58] Field of Search .................. 248/550, 559, 638; 188/378, 267, 151, 259; 267/136

[56] References Cited

U.S. PATENT DOCUMENTS

| | | | |
|---|---|---|---|
| Re. 33,937 | 5/1992 | Schubert | 267/136 |
| 2,964,272 | 12/1960 | Olson | 248/550 |
| 3,088,062 | 4/1963 | Hudimac | 248/550 X |
| 3,703,999 | 11/1972 | Forys | 248/550 |
| 4,033,541 | 7/1977 | Malueg | 248/550 |
| 4,483,425 | 11/1984 | Newman | 188/378 |
| 4,546,960 | 10/1985 | Abrams | 248/559 X |
| 4,635,892 | 1/1987 | Baker | |
| 4,757,980 | 7/1988 | Schubert | 267/136 |
| 4,819,182 | 4/1989 | King | |
| 4,862,506 | 8/1989 | Landgarten | |
| 4,878,188 | 10/1989 | Ziegler | |
| 4,950,966 | 8/1990 | Moulds | |
| 5,000,415 | 3/1991 | Sandercock | 248/550 |
| 5,086,564 | 2/1992 | Schalz | 248/550 X |
| 5,091,953 | 2/1992 | Tretter | |
| 5,105,377 | 4/1992 | Ziegler | |
| 5,127,622 | 7/1992 | Whelpley | 267/136 X |
| 5,133,527 | 7/1992 | Chen | 248/550 |
| 5,156,370 | 10/1992 | Silcox | 248/550 |

FOREIGN PATENT DOCUMENTS 2165667A 4/1986 United Kingdom .

Primary Examiner—J. Franklin Foss
Attorney, Agent, or Firm—James W. Hiney

[57] ABSTRACT

An active force cancellation system adapted to contain vibrations in flexible structures which utilizes co-located vibration sensors and counter-vibration devices to offset linear disturbances without setting off substructure vibrations.

15 Claims, 3 Drawing Sheets

ACTIVE FORCE CANCELLATION SYSTEM

This invention involves a method and system for controlling vibrations in flexible structures such as car frames, building floors and roofs and the like.

BACKGROUND

Previous attempts at controlling such vibrations are disclosed in U.S. Pat. No. 4,635,892, "Active Vibration Suppressor" to Baker; U.S. Pat. No. 4,819,182, "Method and Apparatus for Reducing Vibration of a Helicopter Fuselage" to King et al. and U.S. Pat. No. 4,950,966, "Adaptive Vibration Canceller" to Moulds. In addition, another system is shown and described in U.K. Patent Application GB 2165667A, "Method of reducing the transmission of vibrations" to Redman-White et al.

Methods for controlling vibrations in flexible structures have been recently deemed to have commercial merit such as active engine mounts. The techniques utilized have merit when isolating vibrations of one structure from another structure. The key to doing this is the co-location of control force and sensing means which simplify the problem and make the instant system much better than prior systems.

The active mount takes advantage of the co-location of the vibration "footprint" and the control force and the sensing means at the connection point. However, many technical difficulties exist in the implementation of an active mount. One problem in particular is the coupling of the actuator and resilient means. This problem becomes more troublesome when multiple degrees of freedom are attempted. Thus, it is desirable to have a system in which the benefits of co-location of actuation and sensing is accomplished while avoiding the complexities of active mount integration. The latter goal is particularly important in retrofit situations. For example, in order to actively control the vibration from the engine of a pleasure craft as it enters the hull, active mounts could be used. However, the engine would need re-alignment upon reinstallation. The use of the subject invention would avoid this situation.

It is critical that all connections to a structure (or at least the degrees of freedom in which significant vibration is transmitted) be controlled with the subject invention. In this way all force inputs to the base structure will be controlled. Co-location of the sensor and force producing means will serve to match the "disturbance" input with the control input thereby effecting the modes of the base structure in the same manner, thereby controlling the structure's response.

This invention is intended for use in applications of mounting machinery to flexible structures at discrete mounting points. The discrete mounting point may be either a passive mount, or a direct connection. A passive mount will improve the high-frequency, broadband performance of the system. The actuator in this invention should be any device which uses the inertia of a moving mass to create a force. It should be noted that the sensor and actuator can be integrated into a common package which is then attached to the structure.

Examples of controllers which can be used are shown and described in U.S. Pat. Nos. 4,862,506 to Landgarten et al, 4,878,188 to Ziegler, 5,105,377 to Ziegler, and 5,091,953 to Tretter, all of which are hereby incorporated herein by reference. Other types of adaptive and non-adaptive control systems may be used.

The method of sensing should be a measure of force, preferably a force gauge (such as a PVDF film), or an accelerometer. Displacement or velocity sensing is also possible, however force is the preferred measure. The placement of the sensor in the same "footprint" as the actuator and disturbance source is critical as shown in FIG. 2.

The advantages of co-location sensing and actuation are of critical importance in active vibration control. King describes a system in which a plurality of sensors and actuators are placed around a vehicle in order to alter the structural response of the vehicle. Because the sensors and actuators of King's system are not co-located the disturbance input is not minimized, but the response at the sensor locations are. This indicates that the structural response of the vehicle may be adversely affected at locations other than those of the sensors. I.e., the need for co-location results from the need to effect or force the sub-structure in the same manner as the disturbing input.

The subject invention would place an inertial actuator near the connection points of the disturbance (for example, the engines), and would sense the response of the structure at or near the same point. The concept of "or near" the same point is crucial to this invention. The system (sensor and actuator) must be able to couple into the structural modes of the vehicle in very nearly the same way as the disturbance source. A multiple input, multiple output controller would be used to minimize the force transmission into the vehicle at the point of the disturbance input.

In some, the Redman-White et al application, a system is used which controls both translational and rotational degrees of freedom in a structure. This 2 DOF type of system is critical when controlling flexural wave motion in a structure, however, it is not a configuration where the sensors and actuators are co-located, as they are only anticipating the need to control flexural waves in a well defined structural path. It does not anticipate the subject invention as there is no need to couple into the structure in the same fashion as the disturbance source. It merely attempts to create a certain boundary condition at the point where the sensors are located.

The Baker patent discusses a system in which an inertial actuator is used to reduce the response of a structure at the point of sensing. Zero motion (in one degree of freedom) does not imply the overall reduction of the structural response. As in King, the response of the structure may be worsened in other locations. It is also clear from the disclosure that the need for spatial matching of the disturbance is essential.

The Moulds patent discloses an active vibration canceller, primarily for use in rotating machinery with magnetic bearings. Moulds claims a reaction mass actuator for imparting a control force. However, in several claims it states that the actuator should be at a location other than that of the sensor. Again it does not anticipate the importance of spatial matching the vibrational input of the disturbance source with that of the cancellation force.

Accordingly, it is an object of this invention to provide an improved co-location sensing and actuation system for use in isolating vibrations of a structure.

This and other objects of this invention will become apparent when reference is had to the accompanying drawings in which FIG. 1 is a diagrammtic view of the system comprising this invention, FIG. 2 is a diagrammatic view of an alternate embodiment of the invention, FIG. 3 is a diagrammatic view of still another embodiment of the invention, and FIG. 4 is another diagrammatic view of a further embodiment of the invention.

FIG. 5 is a diagrammatic view of a nearly co-located compensatory system and its relationship to the wavelength of the highest order mode.

FIG. 1 depicts a piece of vibrating machinery (1) mounted on resilient passive mounts (2) which are connected to a flexible foundation (3). In this picture, the flexible foundation is a roof which is supported on I-beams. The inertial shakers (4) and residual sensors (5) are placed near the force transmission path (passive mount) in a manner so as to spatially match the disturbance passed through the passive mount. A controller (6) takes residual vibration input from the residual sensor (5) and possible synchronization signal (7) to synthesize an appropriate output signal which is fed via the amplifier (8) to the inertial shaker (4). The attachment point need not be a passive mount. It is desirable but not necessary. It is important to match the "footprint" of the disturbance. MIMO control is necessary.

Spatial matching of the disturbance force and the controlling force is essential for effective, global vibration control. The structural modes of the flexible foundation are excited by the vibration of the machinery, as transmitted through the connection point (passive mount). In order to provide global vibration control in the flexible foundation, the control forces provided by the inertial actuator must excite the structural modes of the flexible foundation in the same manner as the excitation from the vibrating machine. Thus the inertial shaker (control force) must be placed as near as possible to the disturbance input in order to provide the aforementioned spatial matching.

The distance between the actuator's force input and the disturbance input must be less than ¼ of the wavelength of the highest order mode for which control is required. The highest order mode is defined by the frequency of the disturbance, and the bandwidth of control implemented. All structural modes of the flexible foundation will participate in the response of the structure to the disturbance input at the input point to some extent. Control will be applied to disturbance frequencies which provide an unwanted or troublesome response from the structure. The control force input must be placed within a distance from the disturbance input point of ¼ wavelength of the highest order mode being controlled. If this matching is not provided, control spillover will result.

FIG. 2 depicts another embodiment in which a resilient mount between the machine (1) and the foundation (3) is replaced with a direct structural connection such as depicted by the bolt (2a) and nut (2b) shown. Once again the shaker (4) is placed so as to spatially match the disturbance transmitted into (3) via (2a,b). A force gauge (3) is integrally packaged with the shaker (4) and used to detect the residual vibration.

Figure 1:
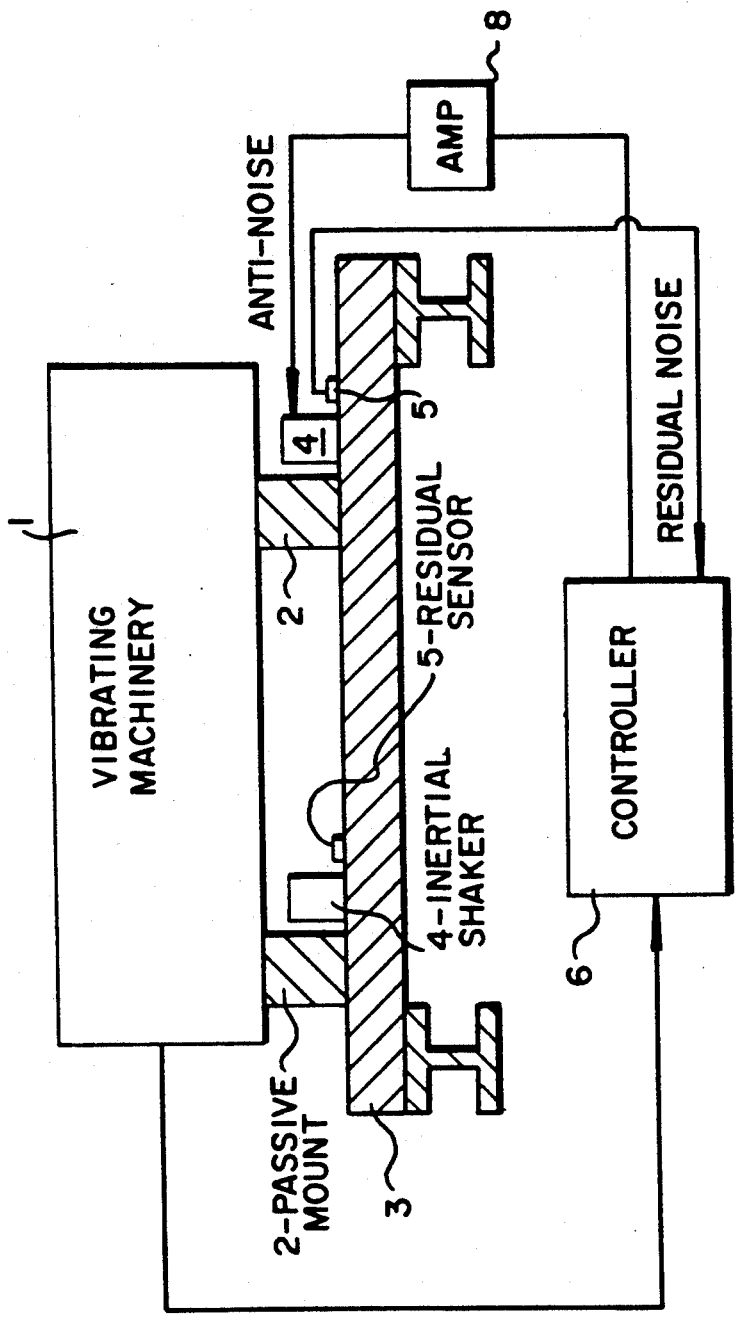
Figure 2:
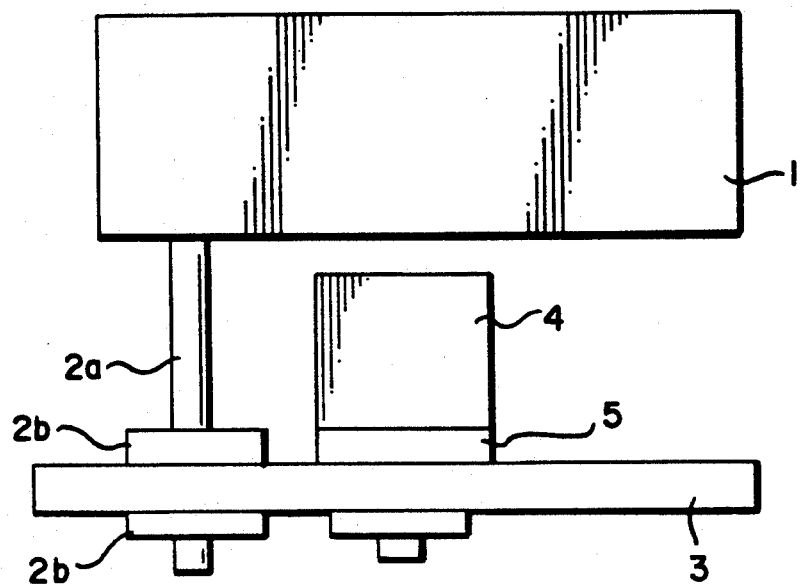
Figure 3:
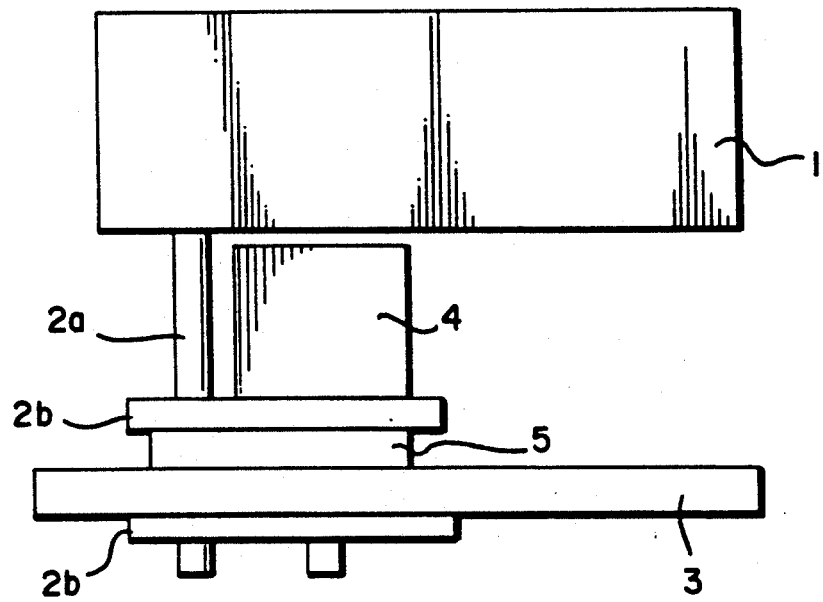
FIG. 3 depicts an embodiment where the machine (1) is directly connected via a bolt (2a) or other means through two plates (2b) which integrally combine the shaker (4), the force gauge (5) and the foundation connection. This enhances the ability to achieve the required spatial matching.
Figure 4:
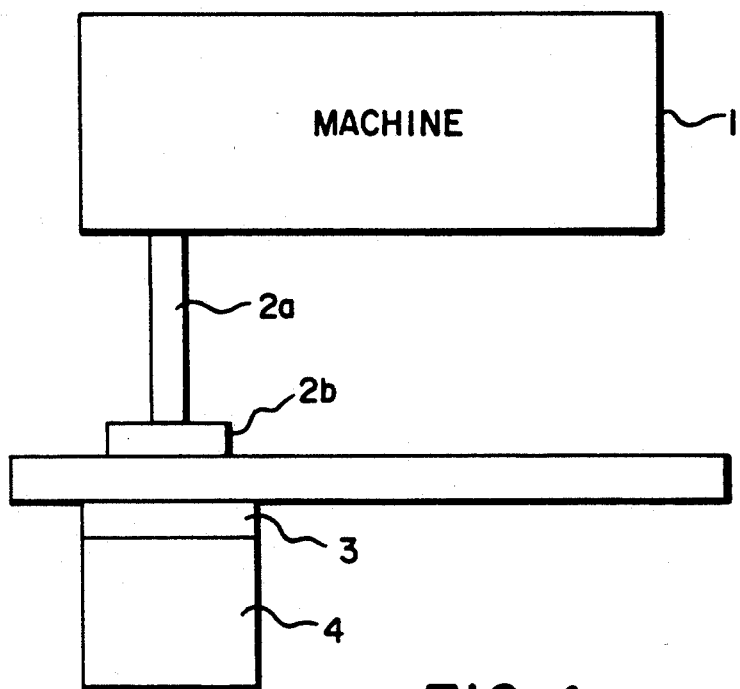
FIG. 4 depicts another embodiment similar to that of FIG. 2, however, the shaker (4) and force gauge (3) are operatively opposed to the direct connection (2a,b). This configuration enhances spatial matching of the canceling vibration with that of the offending vibration.
Figure 5:
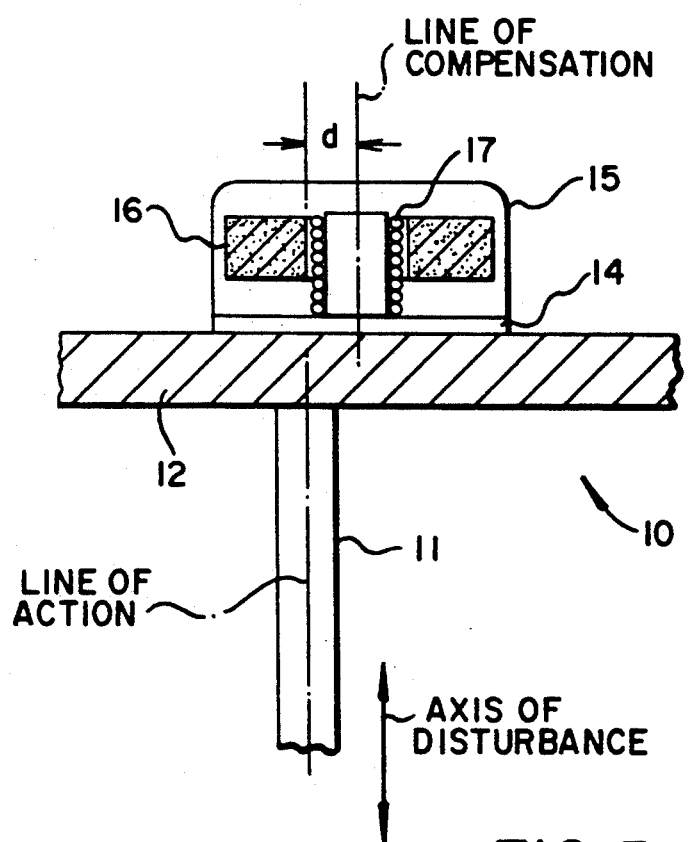

FIG. 5 shows another version of the system comprising this invention with structure (12) having rod (11) attached thereto. The disturbance moves along the axis of the rod (the "line of action"). Mounted atop force gauge (14) on structure (12) is compensating unit (15) having a moving magnetic mass (16) therein which is actuated by coil (17) to move it up and down vertically. The axis of movement of unit (15) (the "line of compensation") is offset from the line of action by distance d. The distance d must be smaller than one quarter of lambda which is the wavelength of the highest order mode being controlled.

Having described the invention and embodiments attention is directed to the claims which define the invention and which cover obvious changes and modifications made by those of ordinary skill in the art.

We claim:

1. An active force cancellation system for controlling vibrations in flexible structures, said system comprising
   a vibration sensing means located on said flexible structure
   counter-vibration means located on said flexible structure
   controller means operatively associated with said vibration sensing means and said counter-vibration means and adapted to cause the latter to vibrate in response to signals from the sensing means so as to eliminate vibrations in said flexible structure.

2. A system as in claim 1 wherein said controller means is a multiple controller and there are at least two counter-vibration means on said flexible structure.

3. A system as in claim 1 and including machinery directly connected to said flexible structure.

4. A system as in claim 3 and including a shaker means connected to said flexible structural member.

5. An active force cancellation system adapted to contain vibrations in flexible structure being acted upon by a disturbance, said system comprising
   a vibration sensor means mounted on said structure and co-located at the disturbance input point so as not to affect the structures modes,
   a counter-vibration means mounted on said structure and also co-located at said disturbance,
   controller means operatively associated with said vibration sensor and counter-vibration means and adapted to cause the latter to vibrate in response to signals from the sensor to thereby eliminate vibrations in said structure without setting off sub-structure vibrations.

6. A system as in claim 5 wherein sensor and counter vibration means are located within one housing.

7. A system as in claim 6 and including multiple sensors and counter vibration means so located on said structure that the sum vector of the sensing and counter-vibration is co-located along the axis of the disturbance.

8. An active force cancellation system for controlling vibrations of various modes occurring along a line of action in structures, said system comprising
   a vibration sensing means located on said structure,
   counter-vibration means located on said structure, said counter-vibration means so located on said structure so as to have its axis of movement parallel to and less than one quarter of the wavelength of the highest order mode being controlled, controller means operatively associated with said vibration sensing means and said counter-vibration means and adapted to cause the latter to vibrate in response to signals from the sensing means so as to eliminate vibrations in said structure.

9. A system as in claim 8 wherein said controller means is a multiple controller and there are at least two counter-vibration means on said flexible structure.

10. A system as in claim 8 and including machinery directly connected to said structure.

11. A system as in claim 10 and including a shaker means connected to said structural member.

12. An active force cancellation system adapted to contain vibrations in flexible structures being acted upon by a disturbance along a line of action, said system comprising a vibration sensor means mounted on said structure and co-located at the disturbance input point so as not to affect the structures modes, a counter-vibration means mounted on said structure and also co-located at said disturbance, controller means operatively associated with said vibration sensor and counter-vibration means and adapted to cause the latter to vibrate in response to signals from the sensor to thereby eliminate vibrations in said structure without setting off sub-structure vibrations.

13. A system as in claim 12 wherein sensor and counter vibration means are located within a single housing.

14. A system as in claim 13 and including multiple sensors and counter-vibration means so located on said structure that the sum vector of the sensing and counter-vibration is co-located along the line of action of the disturbance.

15. A system as in claim 12 wherein the axis of vibration of said counter-vibration means is parallel to and offset from said line of action by a distance less than one-quarter of the wavelength of the highest order mode being controlled.

* * * * *